United States Patent [19]

Coughlan et al.

[11] Patent Number: 4,728,839
[45] Date of Patent: Mar. 1, 1988

[54] MOTORIZED PAN/TILT HEAD FOR REMOTE CONTROL

[75] Inventors: Joel B. Coughlan, Knox County; John R. White, Roane County, both of Tenn.

[73] Assignee: Remote Technology Corporation, Oak Ridge, Tenn.

[21] Appl. No.: 17,564

[22] Filed: Feb. 24, 1987

[51] Int. Cl.⁴ .......................... F41G 1/40; H02K 5/00
[52] U.S. Cl. .................................... 310/112; 248/183; 310/89; 358/108
[58] Field of Search .................. 248/179, 183; 310/89, 310/71; 354/292, 293, 74; 358/99, 100, 108, 199, 229

[56] References Cited

U.S. PATENT DOCUMENTS

| | | | |
|---|---|---|---|
| 3,559,937 | 2/1971 | Paine | 248/183 |
| 4,233,634 | 11/1980 | Adams | 358/108 |
| 4,547,689 | 10/1985 | Tsuchimoto et al. | 310/71 |
| 4,618,886 | 10/1986 | Mooney | 358/108 |
| 4,644,845 | 2/1987 | Garehime, Jr. | 358/108 |

Primary Examiner—Patrick R. Salce
Assistant Examiner—D. L. Rebsch
Attorney, Agent, or Firm—Pitts and Brittian

[57] ABSTRACT

A motorized pan/tilt head and support member for mounting a video camera or the like. A pan/tilt head is mounted upon a first end of the support member. This head is substantially U-shaped, with a bottom cross member and parallel legs at opposite ends of the cross member. The video camera or the like is pivotally suspended between the two legs. Electric motors housed within the cross member and legs, provide panning and tilting motion through the use of gear mechanisms attached to the motors. In order to provide closed loop control, position sensing devices are driven by each of the motors to provide an output signal related to position. The electrical wires of the components pass along the central axis of the support member and terminate at an electrical plug at the second end thereof. This plug mates with a second portion affixed to a surface to which the support member is to be releasably attached. The entire unit is made to be liquid proof, and all components are remotely replaceable. In preferred embodiments, high intensity lights are moved in unison with the video camera. In one embodiment a "crash plate" with limit switches are provided to stop motion of the pan/tilt head if an object is encountered. The unit is principally for use in hardous areas such as those where radioactivity is present.

20 Claims, 4 Drawing Figures

MOTORIZED PAN/TILT HEAD FOR REMOTE CONTROL

DESCRIPTION

1. Technical Field

This invention relates generally to an apparatus that provides for the rotating and tilting of devices attached thereto, known as a pan/tilt head, and more particularly to a pan/tilt head adapted to provide motion over an extensive scan area and for remote control, ease of replacement and other parameters necessary for use in restricted/hazardous environments.

2. Background Art

Remotely-controlled video camera monitors are utilized extensively to provide surveillance of stores, warehouses and many other installations where previously this was performed by individuals. These devices are also used in areas where hazardous conditions exist, such as in chemical processing areas. Typical of the latter type of installation is in the field of nuclear reactor fuel reprocessing. An analogous use is in installations where apparatus containing (or contaminated with) radioactive material is being used, assembled, disassembled or decontaminated. In these applications the video camera monitor not only is used for surveillance, but it is used to provide a video picture of operations within the hazardous area where direct viewing is impossible. These monitors are typically mounted on walls and more often are mounted on moving equipment such as remotely operated manipulators, robots, etc.

In order that a maximum amount of "information" can be obtained with a video camera, the camera is usually mounted upon a pan/tilt head which is designed to rotate about a vertical axis (i.e. pan the camera), as well as about a horizontal axis (i.e., tilt the camera). These pan/tilt heads are often motorized, with one motor for each of the movements. One such unit is manufactured by Motorola. The motors can be operated continuously or for set times to provide routine scanning, or can be operated upon demand.

A pan/tilt head for use with apparatus associated with a radioactive environment must have some characteristics that may not be required for the normal pan/tilt head. For example, it must be sufficiently waterproof such that the exterior can be decontaminated with appropriate liquids. Furthermore, the unit must be easily and remotely replaced if damage should occur. In this connection, the head should be self-aligning when installed. Other desired characteristics are: compact in size; sturdy; no external wires; and an essentially unlimited scan region. A major characteristic is the ability to accurately aim the video camera and to provide information as to that direction. No known device fully meets all these characteristics.

Accordingly, it is an object of the present invention to provide a pan/tilt head for mounting a video camera which can be remotely moved to accurately aim the camera.

It is another object to provide a completely waterproof motorized pan/tilt assembly of compact but durable construction.

It is another object of the present invention to provide a pan/tilt head that is modular such that the head can be totally and remotely replaced, with the replaced head being automatically aligned.

It is a further object of the present invention to provide a motorized pan/tilt head that can be controlled via a closed loop, as with a computer.

It is still another object to provide a pan/tilt head that does not have any external wiring, is automatically wired by placement on a support surface or object containing a mating electrical connector, and can be mounted in any horizontal or vertical plane.

These and other objects of the present invention will become more apparent upon consideration of the drawings identified below, and the detailed description which follows.

DISCLOSURE OF THE INVENTION

In accordance with various features of the present invention there is provided a motorized pan/tilt head mounted upon a suitable support member, typically a tube. This support member is configured for specific applications of the invention, and is releasably mounted from a suitable surface. The interface between the support member and the mounting surface contains the mating components of an electrical plug whereby placement of the support member upon the mounting surface automatically connects circuits in the pan/tilt head (or elements attached thereto) to external circuits. Alignment means, such as pins and captive bolts are used, for example, at the interface in order to facilitate remotely-operated replacement of the pan/tilt head and support member.

The pan/tilt member is pivotally mounted from the support member and principally consists of a yoke with a pair of arms. A video camera (and any other equipment for being moved simultaneously with the camera) is pivotally mounted between these legs. Drive means, such as electrical motors and gears, are positioned within the legs to provide for the rotation of the yoke and for the pivotal tilting of the camera. The shafts driven by the motors are each provided with a position sensing means, such as a potentiometer (or other suitable device), to provide signals as to the orientation of the camera.

BEST MODE

Figure 1:
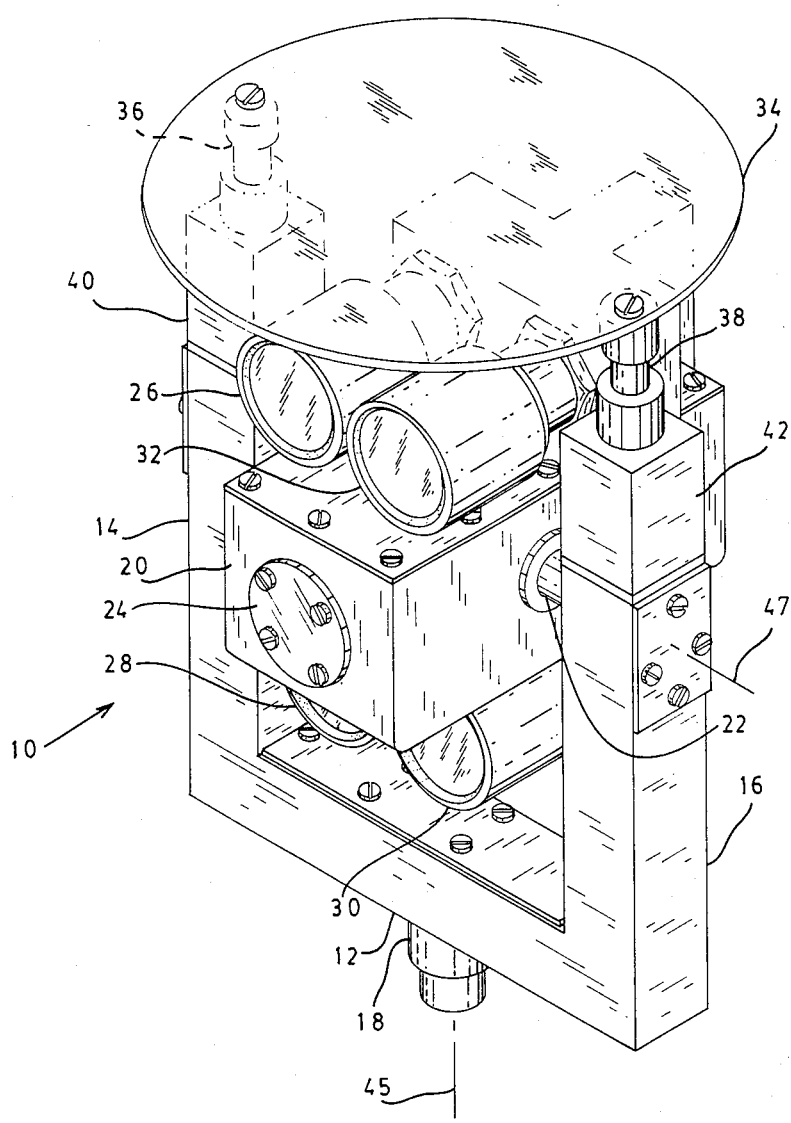
FIG. 1 is an isometric drawing of one embodiment of a pan/tilt head of the present invention. The embodiment shown therein has features in addition to the basic pan/tilt head.
Figure 2:
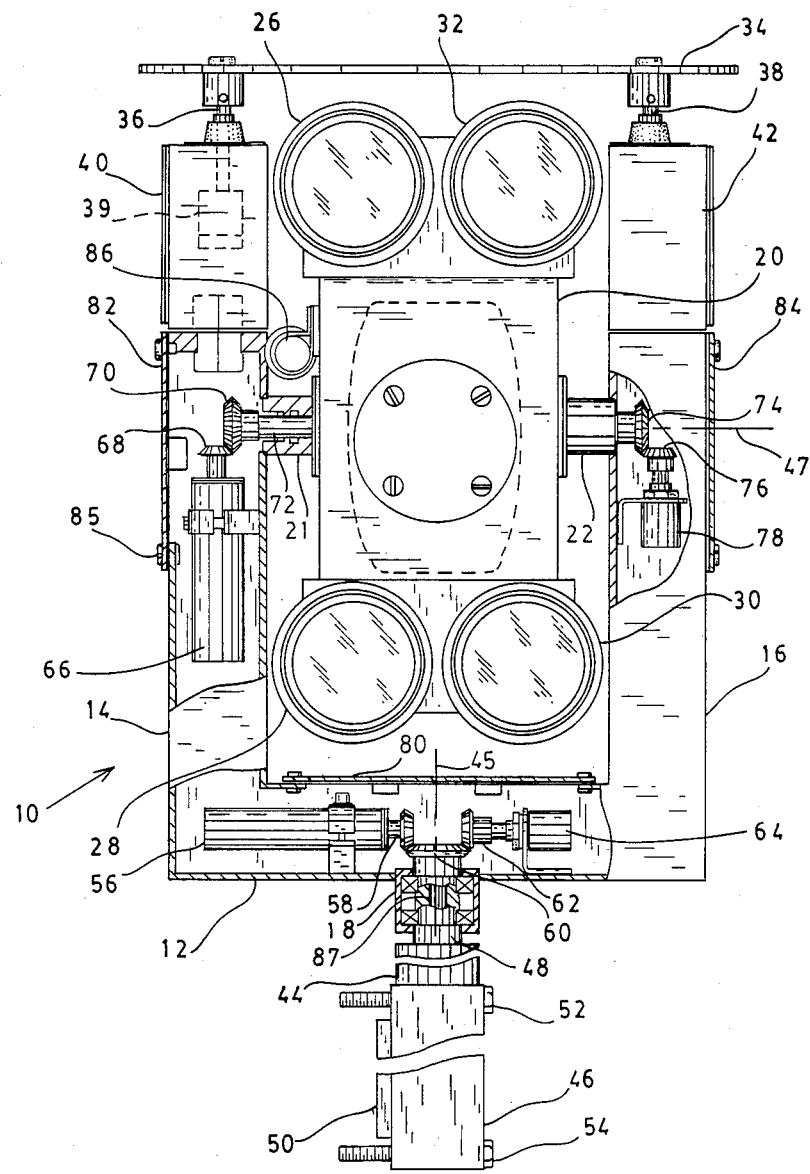
FIG. 2 is a front elevation of the pan/tilt head of FIG. 1 and a support member partially cut away to show internal construction with regard to drive mechanisms and position sensing means.

A pan/tilt head of the present invention is illustrated at 10 in the isometric drawing of FIG. 1. The head is formed principally of a U-shaped yoke formed of a cross-member 12 and a pair of upright legs 14, 16, one each at opposite ends of the cross-member 12. These three components are hollow, as is shown in FIG. 2. The cross-member 12 has a downwardly-extending column 18 at a central position, this column provided for connection to a support base (not shown in this figure). A video camera enclosure 20 is mounted on a pair (one shown) of pivot housings 22 proximate an upper portion of the legs 14, 16. A transparent lens cover 24 is provided to maintain the enclosure water proof.

Although not essential to the pan/tilt head, but certainly of value in many of its uses, are a plurality of high intensity lamp units 26, 28, 30, 32 or other illumination means. These are attached to the camera enclosure 20 so as to move with this enclosure. Mounted above the camera enclosure 20 and lamps 26, 32 is a "proximity member" or "crash plate" 34. The function of this plate 34 (which could be of another configuration) is to limit upward or horizontal travel when the pan/tilt head is attached to an elevating support rod as described below. The plate 34 is supported upon a pair of push rods 36, 38 which, in turn, operate at least one limit switch 39 (see FIG. 2) within the housings 40, 42 mounted atop the legs 14, 16. It is again emphasized that the plate 34, the pushrods 36, 38 and the limit switch housings 40, 42 are not required for all applications of the invention.

As will be described in more detail hereinafter, the pan/tilt head is provided with internal drive means so as to pan about axis 45, and to tilt about axis 47.

Referring now to FIG. 2, shown therein is a front elevation of the pan/tilt head and its support member with certain portions cut away to see internal components. More specifically, the support member of this embodiment is a tubular support 44 extending from a junction box/connector 46 to a top spindle 48. The support member can have any selected length, can be straight or angular, and can have associated therewith some means (see FIG. 4) for raising or lowering the pan/tilt head 10. The junction box/connector 46 is provided with one-half of an electrical connector 50 (see more detail in FIG. 3).

Typically, the junction box/connector 46 is releasably attached to other equipment using a pair of captive bolts 52, 54 or the like. The surface or the equipment (not shown) to which the box 46 attaches is provided with the second half of the electrical connector, and typically includes alignment pins for proper alignment of the two halves of the electrical connector. Optionally the location of the bolts and alignment pins can be reversed.

Mounted within the cross member 12 is a first drive means which typically includes an electrical motor 56 used for effecting the pan motion around axis 45. The direction of rotation is selectable. This motor drives a bevel gear 58 which is meshed with a fixed bevel gear 60 on the end of the spindle 48. Thus, rotation of gear 58 produces the pan motion. A second bevel gear 62 is also meshed with gear 60. This gear 62 also rotates in synchronous motion with gear 58. The gear 62 drives a potentiometer 64, the output of which is proportional to the orientation of the pan/tilt head during pan motion. It is within the scope of this invention to substitute other position-sensing mechanisms for the potentiometer when such position sensing is necessary or desired.

Secured within one of the upright arms (e.g. arm 14) is a second drive means which typically includes an electrical motor 66. This motor is used to rotate bevel gear 68 in a selectable direction, with this gear 68 meshed with gear 70 affixed to a first end of shaft 72 within pivot housing 21. The second end of shaft 72 is affixed to the camera housing 20 so that rotation of the motor 66 causes a selected tilt of the camera housing (and video camera therein). A corresponding shaft (not shown) within pivot housing 22 has a first end attached to the camera housing, and the second end thereof carries a bevel gear 74. This is meshed with bevel gear 76 for transferring any rotational movement to a second potentiometer 78 or other suitable position-sensing device. This position-sensing device provides a signal corresponding to the tilt of the camera.

In order that maintenance can be performed upon the components, a removable cover 80 on the cross member 12 permits access to the motor 56, the potentiometer 64, and their related gears 58, 60, 62. Similarly, removable cover 82 permits access to motor 66 and gears 68, 70. A third removable cover 84 permits access to the potentiometer 78 and gears 74, 76. These plates are typically secured as with bolts 85.

In this FIG. 2 a microphone 86 is shown attached to the camera housing 20. This arrangement is for those applications requiring sound pick-up as well as a video signal.

All of the wiring required by the various components is carried internally within the pan/tilt head 10. The wires 89 (see FIG. 3) are routed down through a central passageway 87 of the spindle 48 and the remainder of the support member 44 to the junction box connector 46. The ends of these wires are joined therein to the electrical connector component 50.

Figure 3:
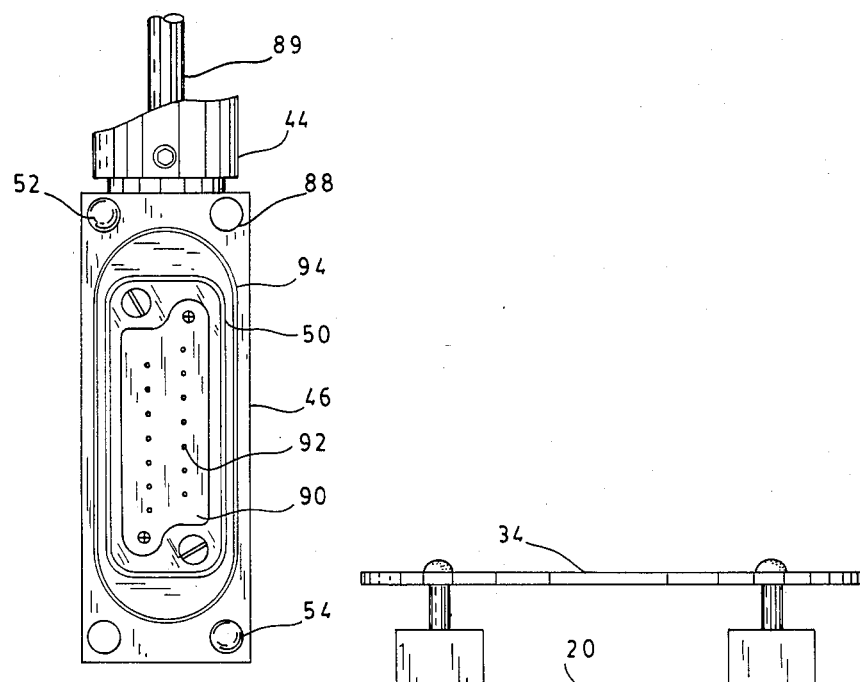
FIG. 3 is a drawing illustrating the face of a typical support means of the pan/tilt head wherein one portion of an electrical plug is positioned to automatically mate with a complimentary plug component on a mounting surface.

A more detailed illustration of the junction box/connector can be seen in FIG. 3. This shows a frontal view of a typical electrical connector. The box 46 is provided with a plurality of holes, as at 88. Typically, two holes are utilized for the afore-mentioned captive bolts (see FIG. 2), and two holes receive alignment pins mounted upon equipment to which the box is to be releasably attached. As stated above, these alignment pins could also be carried by the junction box/connector.

The electrical connector 50 has an insulating base 90, and this base carries a plurality of connecting pins 92 (or in the alternative, receptors for pins). Surrounding the electrical connector 50 is a gasket 94 of a material suitable for the environment to make the electrical connector impervious to liquids and any other deleterious materials.

The unit described in connection with FIGS. 1-3 can have numerous applications. For example, this pan/tilt head and support member can be releasably affixed to the torso of a servo-manipulator. In this manner the unit can be used to visually follow operation of the servo-manipulator. The video camera can be panned and/or tilted to provide the best view of the operation. More than one such pan/tilt unit can be utilized for this application. Because of the construction described above, remote maintenance can be performed on the unit.

In still another application of the present invention, the pan/tilt head on a support member can be attached to various types of remotely operated vehicles such as used for "exploring" hazardous regions. For this application the pan/tilt head can be mounted atop a vertically extendable mast to view various levels. The "crash plate" for this application limits upward or horizontal travel when an obstacle is encountered.

Figure 4:
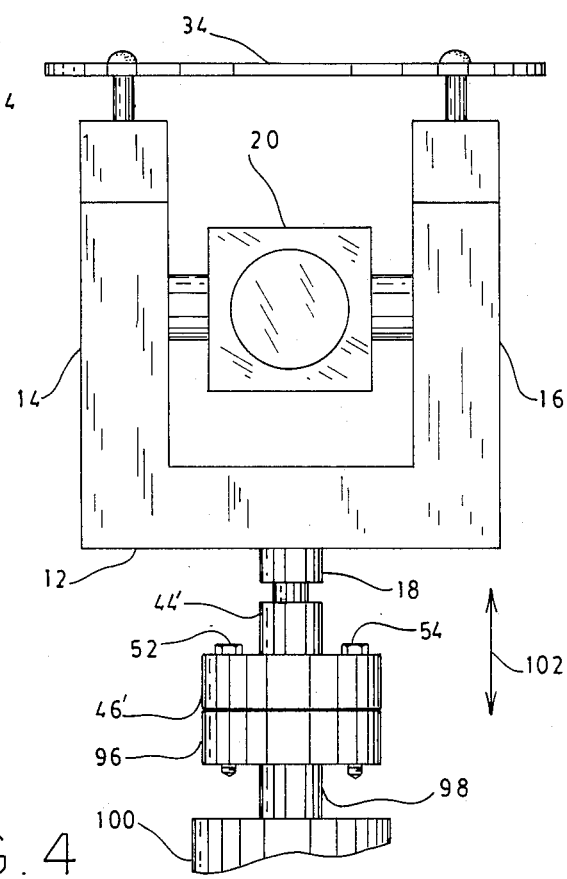
FIG. 4 is a frontal view, in reduced size, of an embodiment of the present invention wherein apparatus is provided for raising and lowering the pan/tilt head.

This application of the invention is illustrated in FIG. 4. All components identical to those of the prior figures carry the same numerals, and components that provide the same function but are differently configured have primed corresponding numerals. In the illustrated construction the connector box 46' at the end of the support member 44 is typically releasably attached to a complementary box 96 with the captive bolts 52, 54. The box 96 is affixed to the top of an elevatable number 98 which is moved with an appropriate mechanism 100. This mechanism, typically, can be an extendable jack-like structure operated by a screw mechansim, a hydraulic mechanism, etc. The mechanism 100 and the elevatable member 98 can be mounted, for example, on a remotely operated vehicle such as a robot. It provides the means for moving the pan/tilt head in the directions indicated by the arrow 102.

Of course, the unit in its most simple form can be mounted in a fixed location for routine surveillance. For this application the lights may or may not be necessary for proper viewing, particularly where there is sufficient light from other sources.

From the foregoing, it will be understood by those versed in the art that a pan/tilt head is provided having substantially spherical coverage. The unit is compact, and is an easily replaceable module for those applications where such is of value. Since position sensors are provided, the pan/tilt head can have closed-loop control as through the use of a computer program. The unit is liquid proof and thus can be used in environments where liquid may be encountered. Although some components have been described rather specifically, the invention is not to be limited by those specific descriptions. Rather the invention is to be limited only by the appended claims, or their equivalents, when taken in combination with the description of the figures.

We claim:

1. A motorized pan/tilt unit, for releasable connection to a support surface that is provided with one half of an electrical connector connected to a power source for providing electrical power to said pan/tilt unit, said pan/tilt unit for the mounting of a video camera and the like, which comprises:
   a support member having a first end carrying a complementary half of an electrical connector to mate with said electrical connector of said support surface when said support member is attached to said support surface to receive said power from said power source, and a second end defining an axis of rotation, said support member provided with a passageway extending from said first end to said second end;
   a substantially hollow pan/tilt head rotatably mounted on said second end of said support member, said pan/tilt head being substantially U-shaped with a hollow base cross member and a pair of parallel hollow legs each having a first ends attached at opposite ends of said base cross member, and second ends, said pan/tilt head further provided with mounting means for said video camera and the like pivotally supported between said legs proximate said second ends, with first electrical drive means connected between said head and said support member and mounted within said base cross member for panning motion of said pan/tilt head around said axis of said second end of said support member, and with second electrical drive means connected between said head and said pivotal mounting means and mounted within one of said legs for tilting of said mounting means for said video camera and the like; and
   electrical leads extending form said first and second drive means of said pan/tilt head through said passageway of said support member to said complementary half of an electrical connector at said first end of said support member.

2. The pan/tilt unit of claim 1 wherein said first drive means comprises:
   a first electric motor adapted for rotation in either direction; and
   first gear means connected between said first electric motor and said second end of said support member whereby rotation of said first motor results in rotation of said pan/tilt head around said axis of said second end of said support member.

3. The pan/tilt unit of claim 1 wherein said mounting means for said video camera and the like is a pivotable housing for enclosing said video camera and the like, and wherein said second drive means comprises:
   a second electric motor adapted for rotation in either direction; and
   second gear means connected between said second motor and said pivotable housing whereby rotation of said second motor results in tilting motion of said housing.

4. The pan/tilt unit of claim 2 further comprising a first position sensing element associated with said first drive means, said first position sensing element providing a signal related to the rotational position of said pan/tilt head relative to said axis of said second end of said support member, said first position sensing element provided with electrical leads extending through said passageway in said support member to said electrical connector at said first end of said support member.

5. The pan/tilt unit of claim 3 further comprising a second position sensing element associated with said second drive means, said second position sensing element providing a signal related to the tilting position of said housing with respect to said legs, said second position sensing element provided with electrical leads extending through said passageway in said support member to said electrical connector at said first end of said support member.

6. The pan/tilt unit of claim 3 further comprising illumination means attached to said housing whereby as said housing is moved said illumination means is also moved to illuminate areas viewed by said video camera and the like, said illumination means provided with electrical leads extending through said legs, said base cross member and said passageway in said support member to said electrical connector at said first end of said support member.

7. The pan/tilt unit of claim 1 further comprising:
   means for reciprocatively moving said pan/tilt in a direction along said axis of said second end of said support member; and
   a proximity member supported at said second ends of said legs and mechanically coupled to limit switches whereby said means for reciprocatively moving said pan/tilt head is disabled when said proximity member encounters an object, said limit switches provided with electrical leads extending through said legs, said base cross member and said passageway in said support member to said electrical connector at said first end of said support member.

8. A pan/tilt unit for supporting a video camera and for releasable connection to a surface provided with one half of an electrical connector, said unit adapted for remote operation to aim said video camera in selected directions, which comprises:

a support member having a first end carrying one half of an electrical connector which is complementary to said one half electrical connector on said surface, and a second end defining an axis, said support member provided with a passageway extending from said first end to said second end;

a pan/tilt head, being substantially U-shaped, having a hollow base cross member pivotally mounted on said second end of said support member at a midpoint of said base cross member, and a pair of parallel hollow leg members, each said leg members having a first end attached at opposite ends of said base cross member, and second ends, said pan/tilt head further provided with a housing for mounting said video camera, said housing pivotally supported between said leg members proximate said second ends;

first electrical drive means positioned within said base cross member for providing panning motion of said pan/tilt head around said axis of said second end of said support member;

second electrical drive means positioned within one of said leg members for providing pivotal tilting motion of said housing for said video camera;

a first position sensing element associated with said first drive means for producing an electrical signal related to a rotational position of said pan/tilt head with respect to said axis of said second end of said support member;

a second position sensing element associated with said second drive means for producing an electrical signal related to a rotational tilting position of said housing with respect to said leg members;

means for reciprocatively moving said pan/tilt head in a direction along said axis of said second end of said support member;

a proximity sensing member supported proximate said second ends of said leg members;

at least one electrical limit switch connected between said proximity sensing member and said second ends of said leg members whereby said means for reciprocative moving said pan/tilt head is disabled when said proximity sensing member encounters a foreign object; and electrical leads within said pan/tilt head and extending through said passageway in said support member connecting said first and second drive means, said first and second position sensing elements and said limit switch to said electrical connector half at said first end of said support member.

9. The pan/tilt unit of claim 8 further comprising:
electrical illuminating means attached to said pivotally mounted housing whereby said illuminating means are directed to areas to be viewed by said video camera when said camera is mounted within said housing; and
electrical leads within said pan/tilt head and extending through said passageway in said support member connecting said illuminating means to said electrical connector half at said first end of said support member.

10. The pan/tilt unit of claim 8 wherein said first end of said support member is provided with connector means adapted for remote connection to, or disconnection from, said surface, and wherein said drive means are adapted for remote replacement.

11. The pan/tilt unit of claim 8 wherein said support member and said pan/tilt head are sealed against ingress of fluids.

12. The pan/tilt unit of claim 8 wherein;
said first drive means is a first electrical motor having a shaft adapted for rotation in either direction, and a first gear means connected between said said shaft of said first motor and said second end of said support member whereby rotation of said first motor results in rotation of said pan/tilt head around said axis of said second end of said support member;
said housing is pivotally supported on shafts extending to said leg means;
said second drive means is a second electrical motor having a shaft adapted for rotation in either direction, and a second gear means connected between said shaft of said second motor and said housing support shafts whereby rotation of said second motor results in tilting motion of said housing; and
said first and second position sensing elements are potentiometers driven by said first and second gear means, respectively.

13. The pan/tilt unit of claim 8 wherein said proximity sensing member is a circular disk carried by said at least one limit switch above said pan/tilt head.

14. The pan/tilt unit of claim 10 wherein said connector means comprises at least two captive bolts extending through said first end of said support means for threadable engagement with threaded receptors in said surface whereby said electrical connector halves are drawn together or separated during connection and disconnection, respectively.

15. The pan/tilt unit of claim 14 further comprising a gasket member surrounding said electrical connector at said first end of said support member to seal against said surface when said first end of said support member is fastened to said surface with said bolts.

16. A motorized pan/tilt unit, for releasable connection to a surface that is provided with one half of an electrical connector, for the mounting of a video camera and the like, which comprises:

a support member having a first end carrying a complementary half of an electrical connector to mate with said electrical connector of said surface, and a second end defining an axis, said support member provided with a passageway extending from said first end to said second end;

a pan/tilt head rotatably mounted on said second end of said support member, said pan/tilt head being substantially U-shaped with a hollow base cross member and a pair of parallel hollow legs each having first ends attached at opposite ends of said base cross member, and a second ends, said pan/tilt head further provided with mounting means for said video camera and the like pivotally supported between said legs proximate said second ends, with electrical drive means within said head for panning motion of said pan/tilt head around said axis of said second end of said support member and for tilting of said mounting means for said video camera and the like;

means for reciprocatively moving said pan/tilt in a direction along said axis of said second end of said support member;

a proximity member supported at said second ends of said legs and mechanically coupled to at least one limit switch associated with said further ends of said legs whereby said means for reciprocatively moving said pan/tilt head is disabled when said proximity member encounters an object; and electrical leads from said electrical drive means and said limit switch threaded through said head and said passageway in said support member and connected to said complimentary half of an electrical connector at said first end of said support means.

17. The pan/tilt unit of claim 16 wherein said drive means for panning motion of said head comprises:
   a first electric motor adapted for rotation in either direction; and
   first gear means connected between said first electric motor and said second end of said support member whereby rotation of said first motor results in rotation of said pan/tilt head around said axis of said second end of said support member.

18. The pan/tilt unit of claim 16 wherein said mounting means for said video camera and the like is a pivotable housing for enclosing said video camera and the like, and wherein said drive means for tilting said mounting means comprises:
   a second electric motor adapted for rotation in either direction; and
   second gear means connected between said second motor and said pivotable housing whereby rotation of said second motor results in tilting motion of said pivotable housing.

19. The pan/tilt unit of claim 17 further comprising a first position sensing element associated with said first gear means, said first position sensing element providing a signal related to the rotational position of said pan/tilt head relative to said axis of said second end of said support member, said first position sensing element provided with electrical leads extending through said passageway in said support member to said electrical connector at said first end of said support member.

20. The pan/tilt unit of claim 18 further comprising a second position sensing element associated with said second gear means, said second position sensing element providing a signal related to the tilting position of said housing with respect to said legs, said second position sensing element provided with electrical leads extending through said passageway in said support member to said electrical connector at said first end of said support member.

* * * * *